(12) United States Patent
He

(10) Patent No.: US 6,170,533 B1
(45) Date of Patent: Jan. 9, 2001

(54) WIREMESH REINFORCEMENT-PLASTIC COMPOSITE PIPE COMPONENT AND METHOD FOR MAKING THE SAME

(75) Inventor: Yi Liang He, Harbin (CN)

(73) Assignee: Starway Pipelines Technology Inc., New York, NY (US)

(*) Notice: Under 35 U.S.C. 154(b), the term of this patent shall be extended for 0 days.

(21) Appl. No.: 09/094,754

(22) Filed: Jun. 15, 1998

(51) Int. Cl.⁷ .................................................... F16L 11/08
(52) U.S. Cl. ........................ 138/127; 138/33; 138/130; 138/133; 138/153; 138/174
(58) Field of Search ...................... 138/174, 127, 138/130, 132, 133, 153, 109, 33, 177

(56) References Cited

U.S. PATENT DOCUMENTS

| | | | |
|---|---|---|---|
| 2,043,769 | * 6/1936 | Norton | 138/174 |
| 2,720,221 | 10/1955 | Neilson . | |
| 3,242,691 | 3/1966 | Robinson et al. . | |
| 3,349,806 | * 10/1967 | Roberts | 138/174 |
| 3,460,578 | 8/1969 | Schmid . | |
| 3,477,474 | * 11/1969 | Mesler | 138/133 |
| 3,479,670 | * 11/1969 | Medell | 138/125 |
| 3,526,692 | 9/1970 | Onaka . | |
| 3,544,281 | * 12/1970 | Phillips | 138/109 |
| 3,578,029 | * 5/1971 | Cullen et al. | 138/133 |
| 3,761,557 | 9/1973 | Werner . | |
| 3,795,472 | 3/1974 | Gruss et al. . | |
| 3,866,632 | 2/1975 | Schaffer . | |
| 3,938,929 | 2/1976 | Stent et al. . | |
| 3,948,293 | 4/1976 | Bixby . | |
| 3,977,440 | 8/1976 | Phillippi . | |
| 4,017,232 | 4/1977 | Holden et al. . | |
| 4,122,228 | * 10/1978 | Tolliver et al. | 138/174 |
| 4,131,757 | * 12/1978 | Felkel | 138/130 |
| 4,135,869 | 1/1979 | Loyer . | |
| 4,140,154 | * 2/1979 | Kanao | 138/174 |
| 4,167,953 | 9/1979 | Carlstrom . | |
| 4,176,274 | * 11/1979 | Lippera | 138/155 |
| 4,258,755 | 3/1981 | Higbee . | |
| 4,657,049 | 4/1987 | Fourty et al. . | |
| 4,674,543 | 6/1987 | Ziemek et al. . | |
| 4,689,174 | 8/1987 | Lupke . | |
| 4,695,335 | * 9/1987 | Lyall | 138/155 |
| 4,746,386 | 5/1988 | Sato et al. . | |
| 4,830,059 | 5/1989 | Silberstang . | |
| 4,832,588 | 5/1989 | Rasmussen . | |
| 4,849,150 | 7/1989 | Kittaka et al. . | |
| 5,176,660 | 1/1993 | Truckai . | |
| 5,244,016 | 9/1993 | Kuroda et al. . | |
| 5,645,109 | 7/1997 | Herrero et al. . | |
| 5,698,278 | * 12/1997 | Emond et al. | 138/133 |

FOREIGN PATENT DOCUMENTS

| | | |
|---|---|---|
| 0 081 095 | 11/1982 | (EP) . |
| 0 303 909 | 8/1988 | (EP) . |
| 1121545 | 11/1966 | (GB) . |
| 1248461 | 6/1968 | (GB) . |

* cited by examiner

Primary Examiner—James Hook
(74) Attorney, Agent, or Firm—Wall Marjama & Bilinski

(57) ABSTRACT

A pipe has a wiremesh reinforcement-plastic composite construction that includes a first and second spiral reinforcing wire layer. The first spiral reinforcing layer has grooves formed at selected intervals, and the second spiral reinforcing wire layer is pressed into the grooves. The first and second spiral reinforcing wire layers are deformed and joined together by pressure to form a wiremesh reinforcement. The two spiral reinforcing wire layers have a left and right spiral angle α1 and α2 respectively relative to the central line, the left and right spiral angles α1 and α2 can change in the range of 0° to 90°. Thermoplastic penetrates the wiremesh reinforcement and fills both sides of the wiremesh reinforcement to form the composite pipe or component.

8 Claims, 4 Drawing Sheets

WIREMESH REINFORCEMENT-PLASTIC COMPOSITE PIPE COMPONENT AND METHOD FOR MAKING THE SAME

FIELD OF THE INVENTION

This invention relates generally to a steel-plastic composite pipe component, and specifically to a wire-mesh reinforcement-plastic composite pipe component and method for making the same.

BACKGROUND OF THE INVENTION

Plastic pipes have been widely used in many fields due to good corrosion resistance, light weight and convenience of installation. However, applications in the industrial field are limited because of lower mechanical strength, lower rigidity and decreased heat-resistance over standard metal pipes. There are numerous configurations of pipe and methods of manufacturing same found in the prior art that have been designed to provide increased mechanical strength, increased rigidity, and greater heat-resistance over plastic pipes.

One example is described in U.S. Pat. No. 3,242,691 to Robinson et al., which describes a method of producing a pipe that includes a flexible shaft assembly including a flexible rotatable metal core, an inner plastic tubing sized to receive the metal core, a plurality of metallic wires helically wound in one direction, and a second plurality of metallic wires helically wound in the opposite direction.

Another example is described in U.S. Pat. No. 3,460,578 to Schmid, which describes a composite flexible shaft casing including an inner plastic liner, a wire braid having wires helically wound to form interstices between the wires, an outer covering extruded over the wire braid and passing through the interstices to engage the liner, and a plurality of axially extending ribs or projections.

U.S. Pat. No. 3,526,692 to Onaka describes a mechanism for continuously coiling wire into a helix and feeding the helix axially through a plastic extruding die where a plastic pipe body is extruded so that the wire helix is embedded in but projects from the outer surface of the pipe body. The pipe body is then passed through a second plastic extruding die in which a tubular plastic layer is bonded to the outer surface of the pipe body.

U.S. Pat. No. 4,258,755 to Higbee describes a flexible reinforced cured resin hose including a combination of helically wound cable wires and body wires embedded therein. Two plies of wires are wrapped in opposite directions around the periphery of a liner tube supported on a mandrel, the plies being supported in a resin filler layer applied over the liner to hold the wires spaced apart.

Yet another example is found in U.S. Pat. No. 4,657,049 to Fourty et al., which describes a reinforced composite tubular body including a metallic reinforcement of helical convolutions completely embedded in a tubular body of thermosetting polymer which has a coefficient of elongation at rupture less than 15%.

Another example of a steel skeleton-plastic composite pipe is described in China Patent 94104509. The pipe described in China Patent 94104509 has distinct advantages over plastic pipes and over other steel-plastic composite pipes known to those skilled in the art, including increased mechanical strength, increased rigidity, and a greater heat resistance. The steel skeleton according to that patent is constructed by both longitudinal and traverse reinforcing wires, and the amount of both longitudinal reinforcing wires and traverse reinforcing wires in the steel skeleton are 50% respectively. To increase the strength of the pipe, the diameter of the transverse reinforcing wire is increased. This results in increasing the wall thickness of the composite pipe.

The devices and methods described in the prior art achieve a certain degree of success in increasing mechanical strength, increasing rigidity, and providing greater heat tolerance in pipe. However, it would be desirable to increase the mechanical strength of a component pipe without significantly increasing the wall thickness. It would also be desirable to provide a method of manufacture of not only composite straight pipe, but also composite pipe components, wherein the method of manufacture offers significant savings in the cost of manufacture.

SUMMARY OF THE INVENTION

It is therefore one object of the invention to provide a composite pipe and components having improved pressure resistance.

It is another object of the invention to provide a composite pipe and components that have improved mechanical strength while maintaining a smaller wall thickness.

Another object of the invention is to provide a composite pipe that has a low hydraulic loss.

Yet another object of the invention is to provide a highly efficient and low cost method for making a composite pipe.

These and other objects are attained by a wiremesh reinforcement-plastic composite pipe and components. The pipe has a wiremesh reinforcement-plastic composite construction that includes a first and second spiral reinforcing wire layer. The first spiral reinforcing layer has grooves formed at selected intervals, and the second spiral reinforcing wire layer is pressed into the grooves. The first and second spiral reinforcing wire layers are deformed and joined together by pressure to form a wiremesh reinforcement. The two spiral reinforcing wire layers have a left and right spiral angle $\alpha 1$ and $\alpha 2$ respectively relative to the central line, the left and right spiral angles $\alpha 1$ and $\alpha 2$ can change in the range of 0° to 90°. Thermoplastic penetrates the wiremesh reinforcement and fills both sides of the wiremesh reinforcement to form the composite pipe or component.

BRIEF DESCRIPTION OF THE DRAWING

For a fuller understanding of the nature and objects of the invention, reference should be made to the following detailed description of a preferred mode of practicing the invention, read in connection with the accompanying drawings, in which.

DETAILED DESCRIPTION OF THE INVENTION

Figure 1:
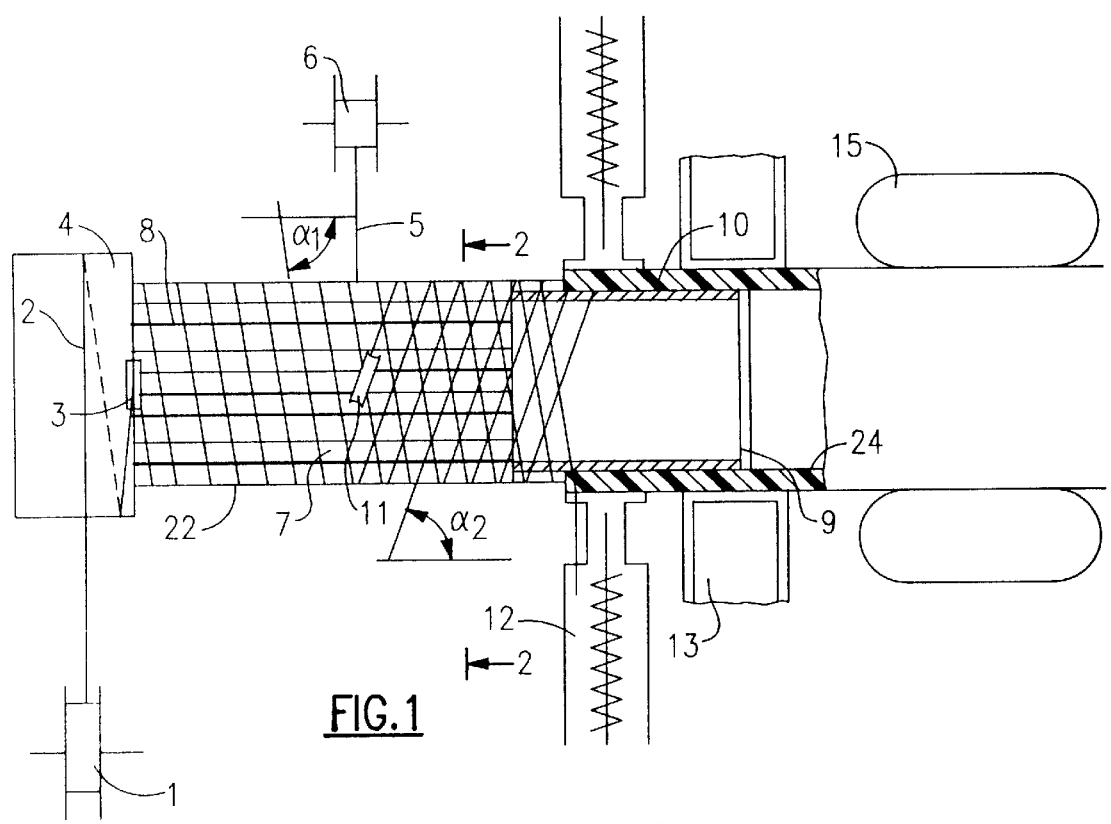
FIG. 1 is a partial cross-sectional side view of the device for making composite straight pipe of the invention in general.
Figure 5:
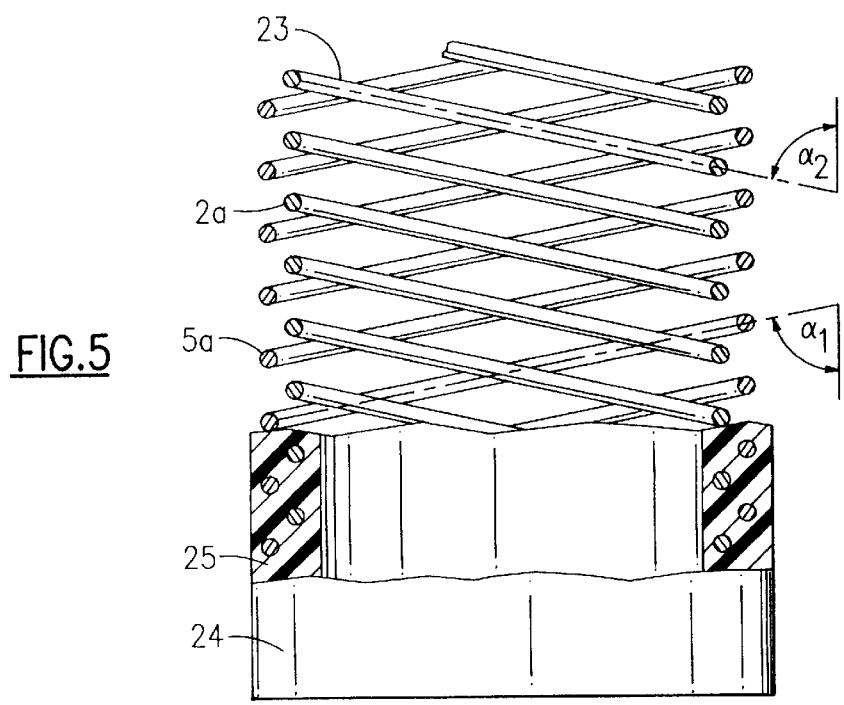
FIG. 5 is a diagrammatic showing the construction of the composite straight pipe according to the invention.
Figure 1A:
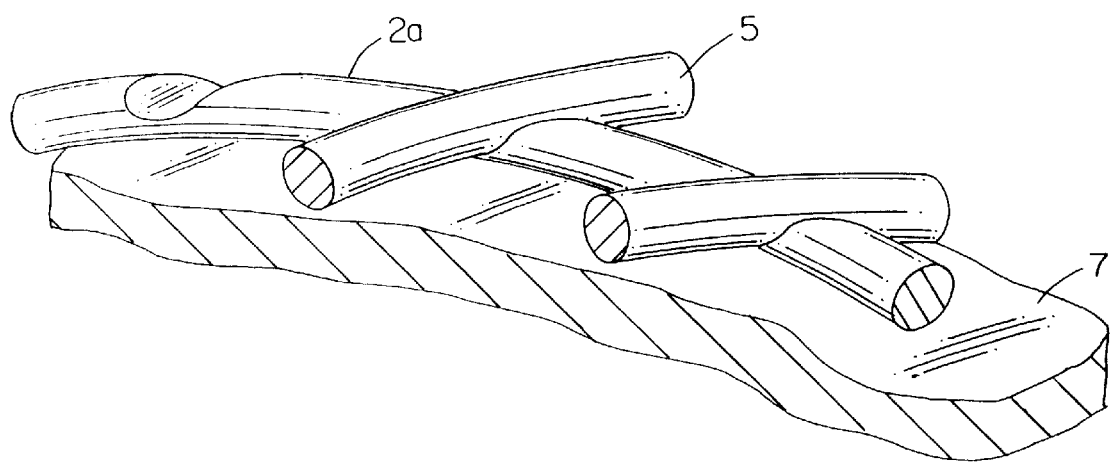
FIG. 1a is a side plan view of the wire reinforcements of the present invention.
Figure 2:
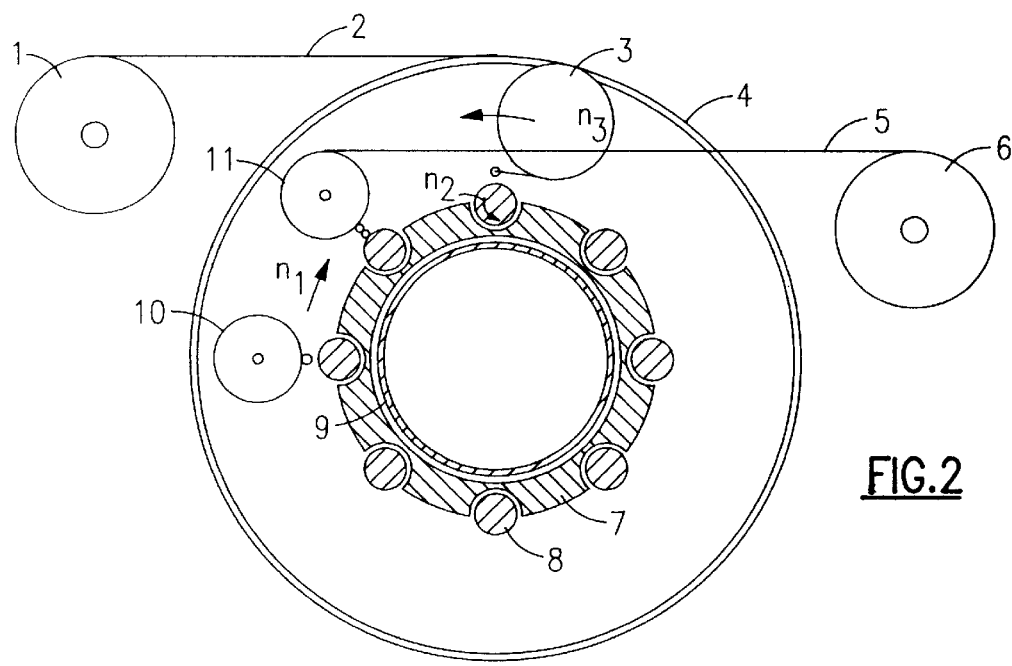
FIG. 2 is a sectional view taken along line A—A of FIG. 1.

Referring now to FIGS. 1 and 2, the method of manufacturing the wiremesh reinforcement-plastic composite pipe of the invention are depicted, and the composite pipe is depicted in FIG. 5. The method of manufacture includes a device which comprises a wiremesh reinforcement braiding machine 22 including a main shaft 7. A thermoplastic extruder 12 is provided and is located to the rear of the braiding machine 22. A pipe forming chamber 16 and a puller 15 are provided downstream of the extruder 12. A plurality of threaded rods 8 are mounted on the main shaft 7. A first spiral reinforcing wire 2 is pulled from a first winding roll 1 and wound onto a disk follower 4, which includes one or preferably a plurality of first winding rollers 3. The first winding rollers 3 are arranged outside the main shaft 7 for winding the first spiral reinforcing wire layer 2 onto the main shaft 7. A cut roller 10 is used to cut a plurality of spaced grooves as shown in FIG. 1a in the transversal section of the first spiral reinforcing wire layer 2a. The grooves are placed at intervals, the intervals are determined by the specific materials that are used for the wire.

During the winding of the wire 2 onto the main shaft 7, the rotation rate of the winding roller 3 is n3, the rotation rate of the main shaft 7 is n1, and the relationship between the rates of rotations is n3>n1. When the first winding roller 3 rotates in the same rotation direction as that of the main shaft 7, the first reinforcing wire 2 is wound onto the threaded rods 8 of main shaft 7 with a right spiral angle α1, to form the first spiral reinforcing wire layer 2a, shown in FIG. 5. When the main shaft 7 rotates, the threaded rods 8 rotate in a manner of planetary motion around the axial of main shaft 7. When the first reinforcing wire layer 2a which is wound on the main shaft 7 the wire 2 passes over the cut roller 10, the cut roller 10 forms grooves (not shown) in the transverse section of the first spiral reinforcing wire layer 2a.

A second reinforcing wire 5 is pulled from a second winding roll 6 and wound onto one or a plurality of second winding rollers 11. Following the rotation of the main shaft 7, the second reinforcing wire layer 5 is wound onto the first spiral reinforcing wire layer 2 with a spiral angle α2 in opposite direction to the angle α1 of the first spiral reinforcing wire layer 2a. This forms the second spiral reinforcing wire layer 5a, which is pressed by a second winding roller 11 into the grooves formed on the first spiral reinforcing layer.

At this point, both of the spiral reinforcing wire layers are deformed under pressure and are joined together in the grooves to form a wiremesh reinforcement 23. It should be noted, if the mechanical connection between the two layers is difficult due to special characteristics of the materials used in the wire, a welding roller may be used instead of the second winding roller 11 and the cut roller 10 will be omitted. The wiremesh reinforcement 23 is continuously moved into a pipe forming chamber 16 by the threaded rod 8. At the same time, the melted thermoplastic 25 is extruded into the pipe forming chamber 16 by an extruder 12. The melted thermoplastic 25 penetrates the wiremesh reinforcement 23 and fills both sides of the wiremesh reinforcement 23 to form a composite straight pipe 24. Then the composite straight pipe is cooled by an inner cool case 9 and an outside cool case 13.

Although in the preferred embodiment the wire is formed of steel, one skilled in the art would recognize that there are numerous materials with various material characteristics that can be used. Likewise, one skilled in the art would recognize that there are various thermoplastics that can be utilized for specific material characteristics related to the end use of the pipe.

When the spiral reinforcing wire layers are wound, the first winding roller 3, the threaded rods 8 and the main shaft 7 rotate in the same direction, and the second winding roller 11 and cut roller 10 are static. Alternatively, when the spiral reinforcing wire layers are wound, the main shaft 7 is static, the first winding roller 3, second winding roller 11 and cut roller 10 rotate around the axial of main shaft, and the second winding roller 11 and the cut roller 10 rotate in the same direction, but the first winding roller 3 rotates in the direction opposite to that of roller 11 and cut roller 10, thus a wiremesh reinforcement is formed. The spiral angles α1 and α2 can vary in the range of 0° or 90°. The spiral angles α1 and α2 may or may not be equal; the choice being dependent upon the different pressure requirements of the pipe and the different plastic materials used in the construction of the pipe.

Figure 3:
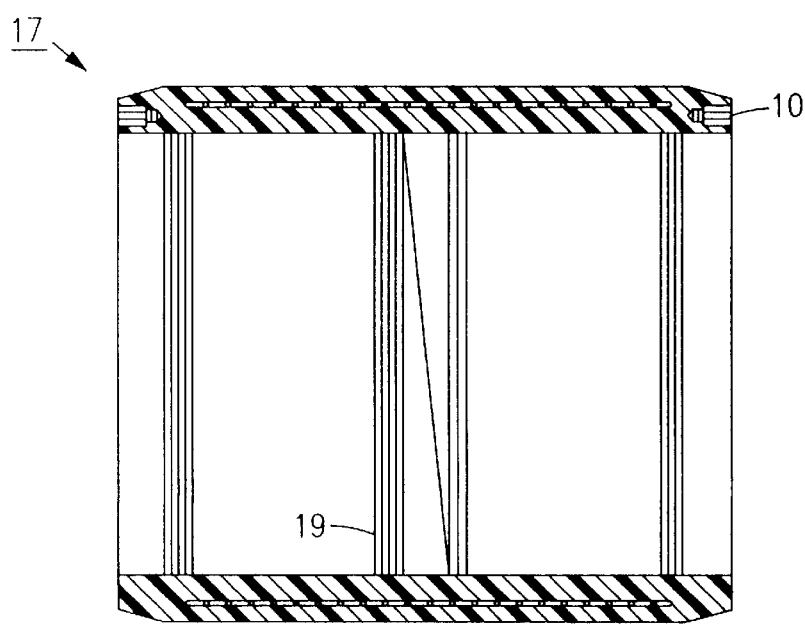
FIG. 3 is a side plan view of the electric-fusion coupler of the invention.

For the connection of composite pipe components, the invention provides two kinds of joints, both of them having a wiremesh reinforcement-plastic composite construction as described above. Referring now to FIG. 3, there is shown an electrofusion coupler 17 which has an electrothermal wire 19 in its inner layer, the electrothermal wire 19 connected with an electric wire outside the joint by an electrical connector 18. When composite straight pipe is inserted into the electrofusion coupler, an electric circuit is set up, and the connection of the electrofusion coupler is achieved.

Figure 4:
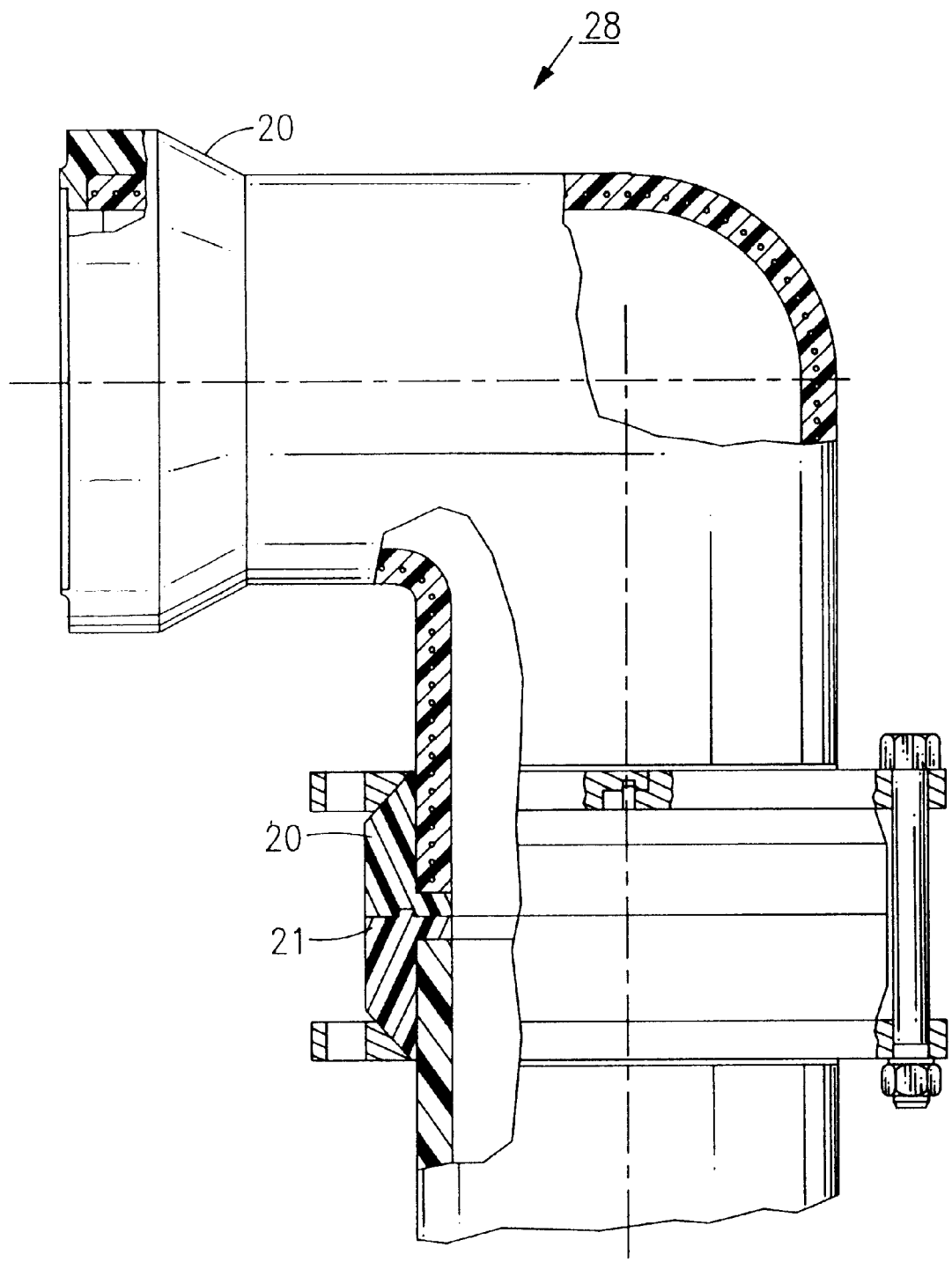
FIG. 4 is a side plan view of the flange coupler of the invention.

Referring now to FIG. 4, a flange coupler 28 is depicted. The ends of the composite straight pipe may be moulded into a cone 20 to form a means to connect the pipe to components or to other sections of pipe. The ends of the flange coupler are moulded into a cone 20, the cone 20 having a surface which cooperates with a respective surface of the composite straight pipe. There is a circular groove 21 on the surface of cone 20 of the flange coupler, a rubber seal ring (not shown) is placed into the groove 21. A pair of metal flanges engage with the cones 20 and press two cones 20 together with bolts, such that the surfaces are sealed.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A composite pipe, said pipe comprising:
    a wiremesh reinforcement, said reinforcement including a first wire, said first wire having a plurality of grooves preformed therein at selected intervals, and a second wire, wherein said first wire is helically wound and said second wire is helically wound about said first wire such that said second wire is placed within said preformed grooves, said reinforcement forming a cylinder with an opening passing axially therethrough; and,
    a thermoplastic completely encasing said wiremesh reinforcement.

2. The pipe of claim 1 wherein said first wire is helically wound at a first spiral angle, said first spiral angle selected in the range consisting of 0 to 90, and said second wire is helically wound at a second spiral angle, said second spiral angle opposite to said first spiral angle, said second spiral angle selected in the range consisting of 0 to 90.

3. The pipe of claim 2 wherein said first and second spiral angles are equal.

4. The pipe of claim 1 wherein said first and second wires are deformed under pressure to form said reinforcement.

5. The pipe of claim 1 wherein said first and second wires are welded together to form said reinforcement.

6. The pipe of claim 1 further comprising a means for coupling.

7. The pipe of claim 6, wherein said means for coupling comprises an electrofusion coupling, said electrofusion coupling including an electrothermal wire connected to a source of electricity by an electrical connector.

8. The pipe of claim 6, wherein said means for coupling comprises a cone, said cone having an opening passing axially therethrough, said cone including a circular groove on the interior surface of said cone, and further including a rubber seal placed into said circular groove.

* * * * *